United States Patent

[11] 3,580,677

[72] Inventor Terrance G. Seelenbinder
 Rolling Meadows, Ill.
[21] Appl. No. 759,939
[22] Filed Sept. 16, 1968
[45] Patented May 25, 1971
[73] Assignee Addressograph-Multigraph Corporation
 Mount Prospect, Ill.

[54] EXPOSURE APPARATUS FOR COPY MAKING MACHINES EQUIPPED WITH LIGHT REFLECTIVE CONVEYOR
2 Claims, 3 Drawing Figs.

[52] U.S. Cl. .................................................. 355/110,
 355/108
[51] Int. Cl. .................................................. G03b 27/10
[50] Field of Search ....................................... 355/110,
 99, 103, 104, 108, 12; 95/11

[56] References Cited
UNITED STATES PATENTS

| | | | |
|---|---|---|---|
| 2,698,561 | 1/1955 | Crowell | 95/11 |
| 1,173,083 | 2/1916 | Banks | 95/11 |
| 2,026,292 | 12/1935 | Van Der Grinten | 96/49X |
| 2,895,395 | 7/1959 | Gern | 355/104 |

Primary Examiner—Samuel S. Matthews
Assistant Examiner—Richard L. Moses
Attorney—Sol L. Goldstein ABSTRACT: An exposure apparatus for copy making machines includes a light source within a light transmitting drum. A flexible endless belt is trained around a portion of the drum, and superimposed original and copy sheets are carried around the drum between the belt and the drum for exposure of the copy sheet in accordance with an image on the original. The amount of light in the exposure area is increased by providing the belt with a light reflecting surface.

PATENTED MAY 25 1971 3,580,677
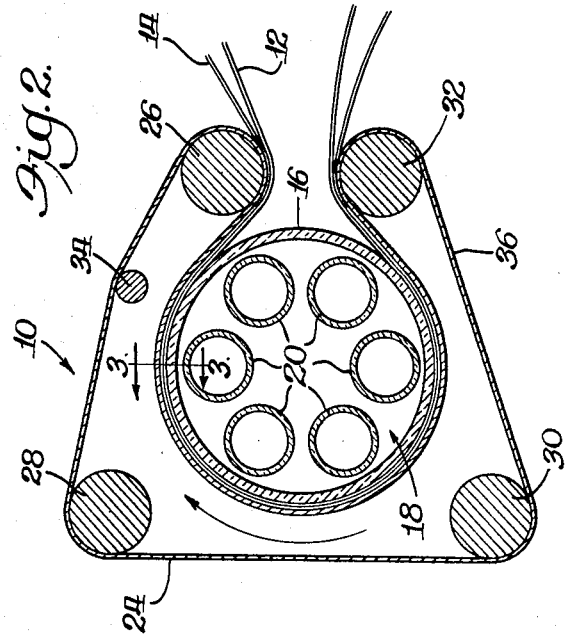
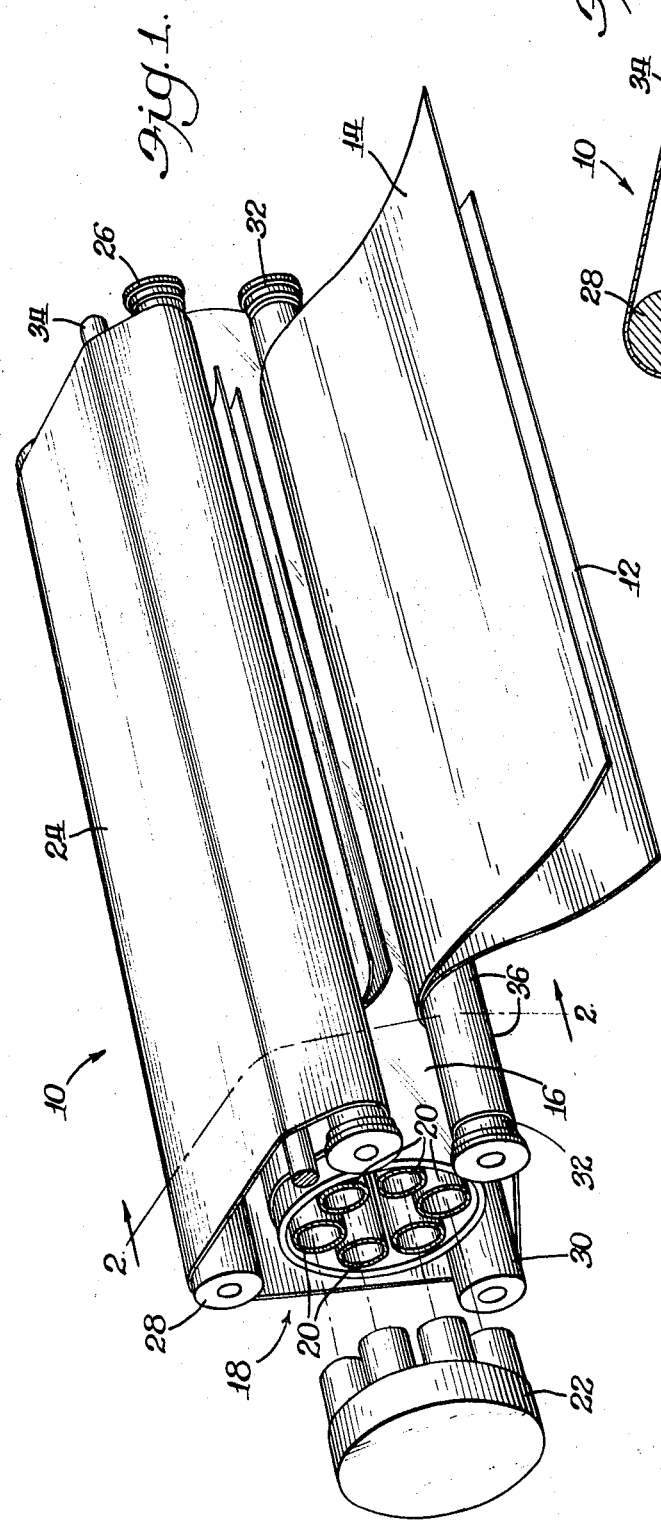
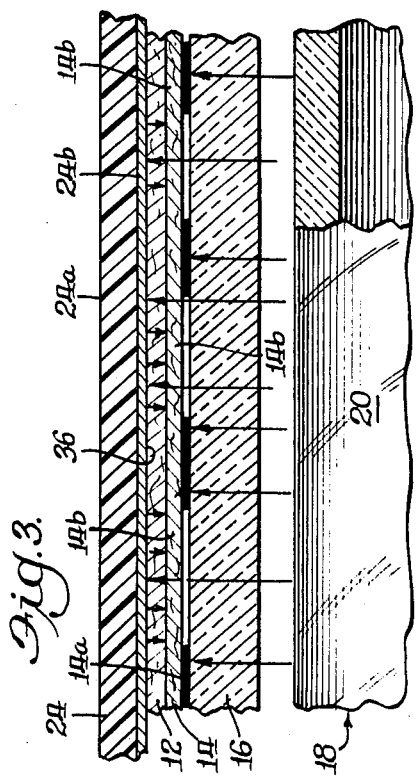
Inventor:
Terrance J. Seelenbinder
By: Sol L. Goldstein
Atty.

EXPOSURE APPARATUS FOR COPY MAKING MACHINES EQUIPPED WITH LIGHT REFLECTIVE CONVEYOR

FIELD OF THE INVENTION

The present invention relates to copy making apparatus of the type wherein a light sensitive copy sheet and an original sheet are superimposed and illuminated to expose the copy sheet in accordance with the original. More particularly, the invention relates to an improvement for increasing the quantity of available light in the exposure area, thereby to increase the efficiency and speed of the exposure operation.

DESCRIPTION OF THE PRIOR ART

A known type of copy making machine includes a rotating light-transmitting drum and a light source within the drum. An endless flexible belt or a plurality of endless flexible bands are trained around a series of rollers and around a portion of the periphery of the drum. An original sheet, such as a tracing or the like, having opaque areas and transparent or translucent areas is superimposed with a light sensitive copy sheet and fed into the nip formed between the rotating drum and the belt or bands. The superimposed sheets are advanced around the drum, and light from within the drum travels through the transparent or translucent areas of the original and selectively exposes portions of the copy sheet. Subsequently, the copy sheet is separated from the original and developed in order to render visible and permanent the image created by exposure.

Many of the problems encountered in the design and use of such copy making machines are related to choice of a light source. It is highly desirable that such machines operate quickly, and for this reason it is important that the exposure operation be carried out as rapidly as possible. It is also desirable that the machine be compact as well as inexpensive to manufacture and to operate.

Many known copy making machines are provided with high intensity lamps such as mercury lamps and the like. This type of lamp provides ample light and permits the exposure process to be carried out rapidly. However, such a lamp leads to some difficulties including expense and high power consumption. Furthermore, the large quantity of heat produced by the lamp gives rise to a necessity for a cooling fan or other means for dissipating the heat. This of course increases the size of the copy making machine.

In order to overcome such difficulties, some machines are provided with one or more fluorescent lamps. Since these are less expensive and operate with less heat than high intensity lamps, they are widely used in compact copying machines such as desk top machines. However, the amount of light produced by fluorescent lamps is limited, and as a result the exposure time required to complete the copy making process is increased. Since speed of operation is one of the most important criteria of machines of this type, this is a highly undesirable result.

Practically all commercially available light sensitive copy sheets are translucent to some extent, and in fact many are nearly transparent. It has been proposed that a reflecting sheet such as a metal foil sheet be fed around the drum along with the original and copy sheets so that light passing through both the original and copy sheets is reflected back toward the copy sheet. In this way more efficient use of light is attained, and the exposure time can be reduced. However, it has been found that the inconvenience and the difficulties involved in superpositioning, aligning and feeding three separate sheets more than offsets any advantage in reduced exposure time.

SUMMARY OF THE INVENTION

Among the important objects of the present invention are to provide improved exposure apparatus for copy making machines, to increase the amount of light available at the exposure area, to provide an improvement making possible faster exposure operations in a machine using a relatively inexpensive light source, and to provide such an arrangement which is simple, convenient to use, and trouble free in operation.

Briefly, an exposure apparatus constructed in accordance with the principles of the invention may comprise a light source enclosed by a rotating light-transmitting drum, together with an endless flexible belt disposed along a closed path partially encircling the drum. An original sheet having opaque areas and translucent or transparent areas is superimposed with a light sensitive copy sheet, and the superimposed sheets move around the drum between the belt and drum. Light from the light source travels through the drum and through the transparent or translucent areas of the original sheet selectively to expose those areas of the copy sheet overlying the light transmitting areas of the original.

In accordance with an important feature of the present invention, the exposure apparatus includes novel structure for increasing the light available at the exposure area. As a result, a less bright light source may be used and the time required for exposure may be reduced. This is accomplished by providing the endless flexible supporting belt with a light-relecting surface in order that light passing through both the original and the copy sheet is reflected back into the exposure area. Since the supporting belt itself is reflective, a very simple and convenient arrangement is provided wherein only the usual two sheets must be aligned and fed into the machine.

DESCRIPTION OF THE DRAWINGS

Many other objects and advantages of the present invention will appear from the following detailed description in conjunction with the drawing in which:

FIG. 1 is a perspective view, partly in exploded section and partly broken away, of an exposure apparatus for a copy making machine constructed in accordance with the principles of the present invention;

FIG. 2 is an enlarged, sectional view of the exposure apparatus taken along the line 2–2 of FIG. 1; and FIG. 3 is a greatly enlarged, fragmentary, sectional view taken along the line 3–3 of FIG. 2.

DESCRIPTION OF THE ILLUSTRATED EMBODIMENT OF THE INVENTION

Referring now to the drawing, there is illustrated an exposure apparatus designated generally as 10 for use in a well-known type of copy making machine not otherwise illustrated. In general, the exposure apparatus 10 serves to expose a light sensitive copy sheet 12 in accordance with an original sheet 14. After exposure, and as will be readily understood by those skilled in the art, the copy sheet 12 is separated from the original sheet 14 and treated by well-known developing equipment (not shown) to render the exposed image visible. As described in detail hereinafter, the exposure apparatus 10 of the present invention is provided with an improvement for increasing the amount of light available in the exposure area.

During the exposure operation, the copy sheet 12 and original sheet 14 are supported against the surface of a light-transmitting cylinder or drum 16. Within the drum 16 is disposed a light source generally designated as 18 comprising, in the illustrated embodiment of the invention, a cluster of several fluorescent lamps 20. It should be understood however that any other type of light source could be substituted for the fluorescent lamps 20 if desired. The opposite ends of the drum 16 may be enclosed by suitable opaque hub members 22 adapted to electrically and mechanically receive the ends of the fluorescent lamps in fixed relationship to drum 16, one of which is illustrated in FIG. 1, and the hub members are preferably provided with suitable terminal means (not shown) for energizing the fluorescent lamps 20.

In order to maintain the copy sheet 12 and the original sheet 14 against the surface of the drum 16, the exposure apparatus 10 includes a flexible endless supporting belt 24. As best illustrated in FIG. 2, the belt 24 encircles the drum 16 throughout a substantial portion of the periphery of the drum. The belt 24 is trained about several rollers 26, 28, 30 and 32 in addition to being trained about the drum 16. Furthermore, a shaft or roller 34 engages the belt 24 and preferably is adjustable to maintain the desired tension on the belt 24.

Movement of sheets around the drum 16 is achieved by rotation of the drum and concurrent movement of the belt 24 in the direction illustrated by an arrow in FIG. 2. Some or all of the rollers 26, 28, 30 and 32 may be driven, and the drum 16 is rotated either by means of the belt 24 or by a separate driving structure.

When it is desired to expose a copy sheet 12 in accordance with an image carried by an original sheet 14, the copy sheet and original are superimposed with one another and fed into the nip created between the belt 24 and the roller 16, approximately in the region of the roller 32 (see FIG. 2). The original and copy sheet are then sandwiched between the drum 16 and the belt 24 and are moved around the periphery of the drum and exit from the exposure apparatus in the neighborhood of the roller 26.

The exposure process may best be understood from reference to FIG. 3. As there illustrated, the original sheet 14 lies next adjacent the surface of the rotating drum 16, while the copy sheet 12 overlies the original sheet 14. The original sheet carries an image to be copied, and thus includes substantially opaque image areas 14a interspersed with either transparent or translucent nonimage areas 14b. For example, the original sheet 14 to be copied may be in the form of a tracing or a film.

Light from the light source 18 travels through the light-transmitting wall of the drum 16 and strikes the original sheet 14. Light striking the opaque areas 14a of the original sheet 14 is absorbed while light reaching the translucent or transparent areas 14b travels through the original sheet 14 and strikes the copy sheet 12. The copy sheet 12 may be formed of or include any suitable type of light sensitive material, such as a diazo material or the like. Light reaching the copy sheet 12 selectively exposes those areas of the sheet overlying the transparent or translucent areas 14b of the original sheet, and produces an exposure image later rendered visible by suitable developing equipment.

The contrast and the quality of the final image depend upon the amount of light reaching the copy sheet 12 during the exposure process. The amount of light is in turn a function of the intensity of the light source and of the exposure time. For example, if a bright light source is used the exposure time required for full exposure is relatively short. On the other hand, if a less bright light source such as one or more fluorescent lamps is used, the required exposure time is greater. One objection to exposure apparatus such as the apparatus 24 making use of fluorescent lamps is that the exposure time required is too great, and that therefore the time required to produce a completed copy is too long.

In accordance with an important aspect of the present invention, the amount of light available in the exposure area for exposing the copy sheet 12 is increased by providing the endless flexible supporting belt 24 with a reflective surface 36 (FIG. 3). Accordingly, and as indicated by arrows in FIG. 3, any light travelling through both the original sheet 14 and the copy sheet 12 strikes the reflecting surface 36 and is directed back to the copy sheet 12. As a result, light which in known copying machines is merely absorbed or otherwise lost is used in the illustrated machine to increase the efficiency of the exposure process.

Many types of light sensitive copy sheets are highly transparent, and nearly all are translucent to some degree. Thus a substantial amount of light is capable of passing through not only the original sheet 14 but also the copy sheet 12. Consequently, the arrangement of the present invention serves greatly to increase the amount of light available at the exposure area. For example, it has been found that the exposure time required fully to expose a copy sheet may be reduced from 20 to 30 percent by making use of the structure of the present invention.

The reflecting surface 36 of the endless flexible belt 24 may be provided with any desirable material. One construction which has been found to be highly satisfactory is a belt having a body portion 24a formed by Mylar or other suitable flexible plastic material, together with a layer 24b of metal. Preferably the metal layer 24b comprises an aluminum layer bonded to the surface of the belt by a vapor deposition process or the like. In addition, other reflecting materials and/or belt materials may be utilized.

One important advantage of the arrangement of the present invention is its great simplicity and convenience in operation. Since the reflecting surface 36 is an integral part of the belt 24, there is no necessity of handling an additional sheet or the like in order to obtain the advantages of reflection of light in the exposure area. The reflecting surface is always available at the exposure area without any special efforts of the operator of the machine, and the making of a copy involves only the usual steps of superimposing and feeding the original sheet 14 and the copy sheet 12.

Although the present invention has been described with reference to one illustrative embodiment thereof, it should be understood that other modifications and embodiments may be devised by those skilled in the art that fall within the spirit and scope of the principles of the invention.

What I claim and desire to be secured by Letters Patent of the United States is:

1. Apparatus for exposing a transparent or translucent light sensitive copy sheet in accordance with an original sheet having transparent or translucent areas, said apparatus comprising: in combination, a rotatable light-transmitting drum having a cluster of tubular fluorescent lamps mounted therein with the opposite ends of said drum being closed off by opaque hub members, each said hub including means for supporting said cluster of lamps within said drum in parallel alignment with respect to each other and said drum, a plurality of spaced apart roller members and an endless flexible belt member trained about said rollers and enveloping said drum and movable thereabout with the rotation of said drum, said belt member being of a width equal to or greater than said copy and original sheets and sandwiching the copy sheet and the original sheet together against the surface of said light-transmitting drum, with said original sheet in contacting relation with said drum, the surface of said endless belt member directed toward said light-transmitting drum being formed of a flexible layer of material which is highly reflective to light for reflecting light emanating from said cluster of lamps and traveling through said drum and both the original sheet and copy sheet and back toward said copy sheet, thereby to increase the efficiency of the amount of light available from the exposure of said copy sheet and to decrease the exposure time therefore.

2. Apparatus as claimed in claim 1, said surface of said unitary support member being aluminum.